Aug. 22, 1944.    G. H. GLOSS ET AL    2,356,395
PROCESS FOR MANUFACTURE OF MAGNESIUM PRODUCTS
Filed June 7, 1941
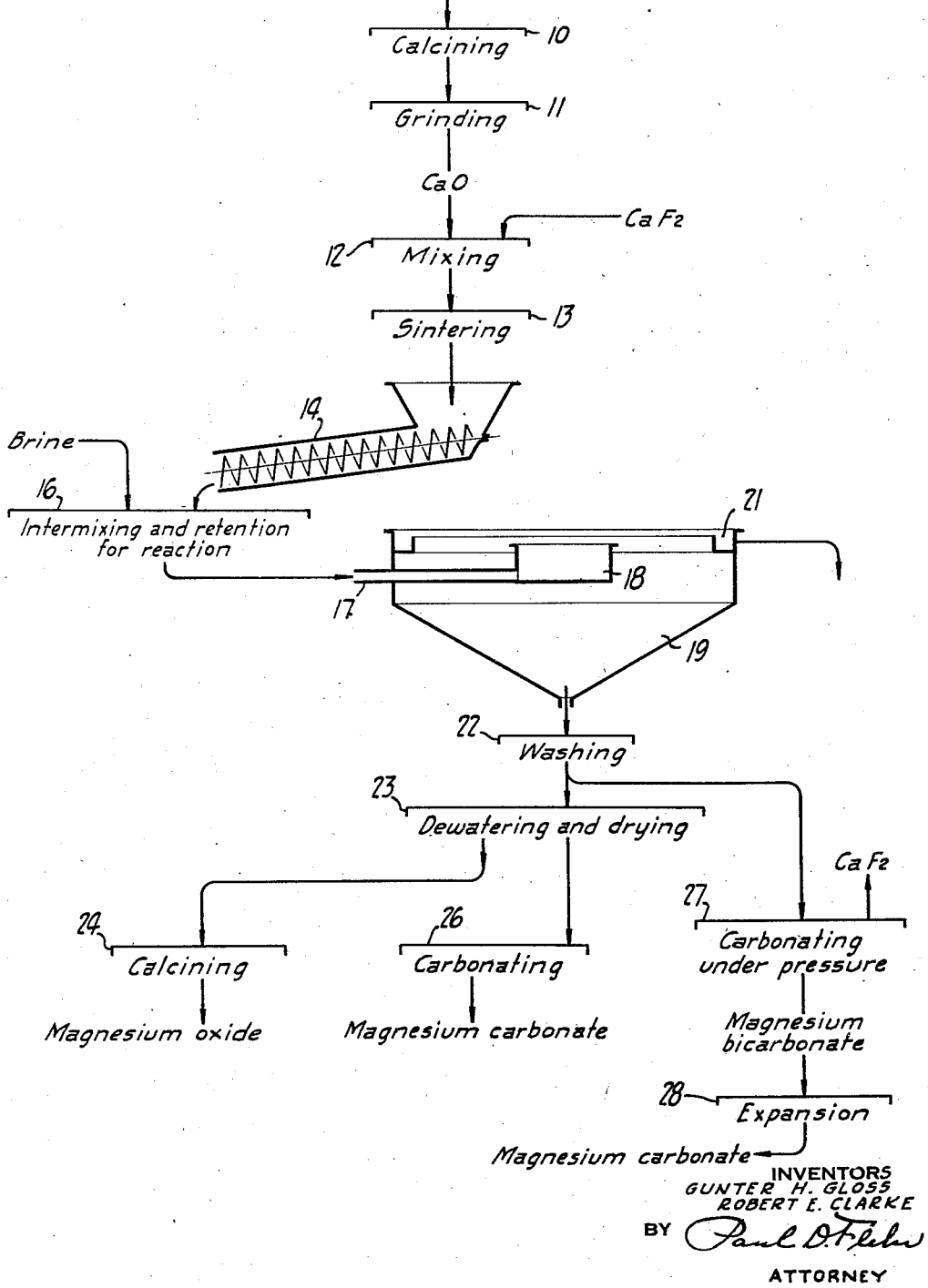
INVENTORS
GUNTER H. GLOSS
ROBERT E. CLARKE
BY
ATTORNEY Patented Aug. 22, 1944

2,356,395

UNITED STATES PATENT OFFICE 2,356,395

PROCESS FOR MANUFACTURE OF MAGNESIUM PRODUCTS

Gunter H. Gloss, Belmont, and Robert E. Clarke, Palo Alto, Calif., assignors to Marine Magnesium Products Corporation, San Francisco, Calif., a corporation of Delaware Application June 7, 1941, Serial No. 397,072

5 Claims. (Cl. 23—67)

This invention relates generally to processes involving precipitation of magnesium hydroxide from sea water or like relatively dilute brines containing convertible magnesium salts.

It is an object to provide a process which is applicable to relatively dilute brines such as sea water, where it is particularly difficult to secure a high settling rate by known processes.

Further objects of the invention will appear from the following description in which the preferred embodiments of the invention are set forth in detail in conjunction with the accompanying drawing.

In the past various calcium-bearing materials such as limestone, oyster shells, or dolomite have been calcined for the purpose of forming an available source of lime for reaction with sea water or like dilute brine containing convertible magnesium salts. It has been known that a number of factors affect the character of the precipitate obtained. In general, more concentrated brines tend to produce a more crystalline and fast settling precipitate than the dilute brines such as sea water. Also, it has been known that the calcining temperatures employed have an effect upon the character of the precipitate, and it has been observed that higher calcining temperatures tend to produce a less reactive lime, and that such lime when reacted with brine tends to produce a faster settling and more crystalline precipitate.

The present invention has been predicated upon our discovery that when calcium oxide is heated to an elevated temperature with material like calcium fluoride, a definite sintering action takes place, and this sintered material when reacted with sea water will produce a magnesium hydroxide precipitate which is considerably faster settling and more crystalline than the precipitate produced by the unsintered calcium oxide.

Referring to the flow sheet, we can practice the invention as follows: A calcium-containing compound such as limestone, oyster shells, or dolomite is shown being calcined at 10 to produce available calcium oxide. In the case of dolomite, the calcium oxide is mixed with magnesium oxide. This calcined material is then ground at 11 and intermixed with a small amount of calcium fluoride in the mixing operation 12. The mixture is then subjected to the sintering operation 13. The amount of calcium fluoride may vary over wide limits, but good results can be secured by using from about 1 to 5% by weight. The sintering operation must be carried out in suitable equipment capable of withstanding the temperatures required. In general, temperatures of the order of from 700 to 1,100° C. can be employed.

During the sintering operation the material can be in the form of a layer of the powdered material, or it may be in the form of tablets or briquets. Following the sintering operation 13, which requires only a short interval such as from 30 to 60 minutes, the material is prepared for use as a precipitant. The fastest settling rates can be secured by taking the sintered material and grinding it to the form of a powder, which powder is directly contacted with brine to be precipitated. Thus, in Figure 1 it is assumed that the sintered material is being ground to the form of a powder, and is then supplied to the conveying means 14, which delivers it at a regulated rate for contact with the sea water or like dilute brine in the intermixing and retention operation 16, where it is retained until the precipitating reaction is completed. Pipe 17 serves to deliver the reaction mixture to the submerged feed box 18 in the settling tank 19. In this settling tank, the precipitated magnesium hydroxide settles into a lower compression zone, while the mother liquor flows out through the overflow launder 21.

The slurry formed in the lower part of settling tank 19 is withdrawn, and in a typical instance can be subjected to the washing operation 22 with fresh water for the removal of soluble impurities such as sodium chloride. This washing can be carried out by known procedures such as by countercurrent washing and decantation. Following such a washing operation, the material can be subjected to dewatering and drying 23.

Assuming that a commercial installation in accordance with Figure 1 is being used to manufacture a number of products, including magnesium oxide and magnesium carbonate, a certain amount of the dewatered and dried hydroxide is shown being supplied to the calcining operation 24, for the production of a magnesium oxide. Another part is shown being subjected to the conventional open kettle carbonating operation 26, for the production of magnesium carbonate.

Both the magnesium oxide and magnesium carbonate produced in this fashion will contain small amounts of calcium fluoride. For many commercial applications, such a fluoride content is not objectionable, and may even be desirable. Should it be desired to produce a magnesium compound which is free of calcium fluoride, a certain amount of the material from operation 22 can be supplied to the carbonating operation 27, where it is carbonated under pressure greater than atmospheric to produce soluble magnesium bicarbonate. The insoluble calcium fluoride settles out in this operation, and can be separately removed. The magnesium bicarbonate solution, free of the calcium fluoride, is shown being withdrawn and expanded at 28 to form magnesium carbonate. It will be apparent that this magnesium carbonate in turn can be calcined to form a purified magnesium oxide.

The procedure outlined above in connection with Figure 1 can be modified in certain respects. For example, if it is desired to minimize the amount of grinding upon the sintered material, the sintered material can be hydrated in water to form a calcium hydroxide slurry, and this slurry employed as a precipitant. Such a slurry will not produce a precipitation rate as fast as the unslaked material, although a slurry formed from the sintered material will afford a substantially higher precipitation rate than a slurry formed directly from calcined and unsintered lime.

It appears that fluorides other than calcium fluoride can be employed, such as sodium, potassium, and magnesium fluorides or fluosilicates. Calcium fluoride is particularly desirable because of its low cost.

The limestone or other lime bearing material contains varying amounts of silica. A reaction may take place in the sintering operation 13 between the fluoride and the silica to form calcium fluosilicates, thereby increasing the binding action and sintering effect of the original fluoride.

As previously stated, the present process makes possible a fast settling and relatively crystalline precipitate. Furthermore, such a fast settling precipitate is obtained with relatively dilute brines, like sea water. The settling rates obtained will depend somewhat upon the type of lime or lime-bearing material utilized, the temperature and extent of the sintering, and the amount of fluoride employed. In general, a greater amount of sintering results in a faster settling precipitate.

As an example of settling rates which have been obtained by laboratory tests in connection with the precipitation of sea water, settling rates of the order of 6 inches per hour have been secured for a commercial lime mixed with about 3% of calcium fluoride with the mixture briquetted, calcined at 1,000° C., and then slaked to form a slurry before contact with the sea water. With the same sintered lime ground to minus 100 mesh and contacted with sea water without slaking, a settling rate of the order of 12 inches per hour was obtained. In contrast with the settling rates obtained by sintering with calcium fluoride, the same lime without sintering gave a settling rate of the order of 3 inches per hour when slaked to form a slurry, and about 7.5 inches per hour when directly introduced into the brine without slaking.

The attainment of high settling rates greatly simplifies the equipment required for the necessary settling, washing and dewatering operations, and affords a relatively high capacity for equipment of a given size. The present process can be used to advantage to promote large scale, low cost production of magnesium products, and it can be employed wherever sea water and inexpensive sources of lime are available.

We claim:

1. In a process of the character described, precipitating a fast settling magnesium hydroxide from sea water by contacting the sea water with calcium oxide sintered with a fluoride.

2. In a process for the precipitation of magnesium hydroxide from sea water, the steps of sintering calcium oxide with a fluoride and then using the sintered material as a precipitant for reaction with the sea water.

3. In a process for the precipitation of magnesium hydroxide from sea water, calcining a calcium containing mineral to form a calcium oxide containing calcine, grinding the calcine, mixing the ground material with calcium fluoride, heating the mixture to an elevated temperature to sinter the same, and then using the sintered material as a precipitant for reaction with sea water.

4. In a process for the precipitation of magnesium hydroxide from sea water, the steps of sintering calcium oxide with a fluoride, contacting the sintered material with sea water to precipitate magnesium hydroxide, and recovering the precipitated magnesium hydroxide from the mother liquor of the sea water together with the residual fluoride content of the sintered material.

5. In a process of the character described, precipitating a fast settling magnesium hydroxide from sea water by contacting the sea water with a precipitating material comprising calcium oxide sintered with a fluoride, recovering a precipitate including magnesium hydroxide and residual fluoride of the precipitating material, carbonating said precipitate to form magnesium bicarbonate and separating the bicarbonate from the fluoride.

ROBERT E. CLARKE.
GUNTER H. GLOSS.